April 3, 1962  B. A. FIGHTMASTER  3,027,638
PIPE CUTTERS
Filed April 6, 1960
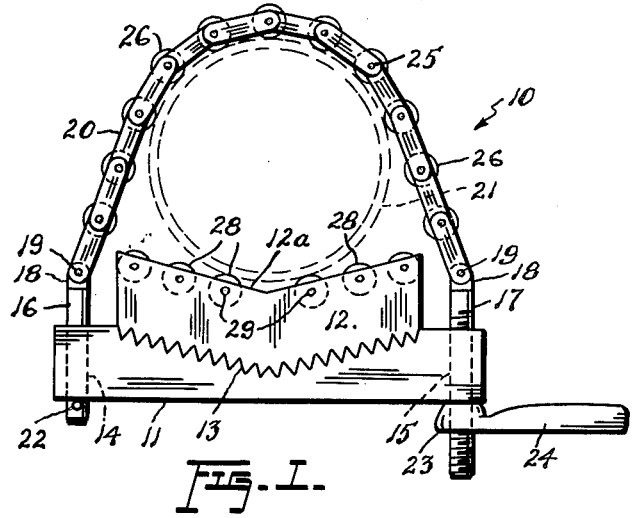
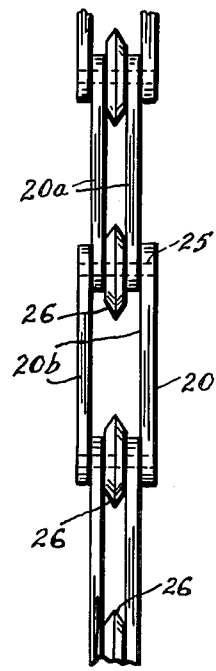
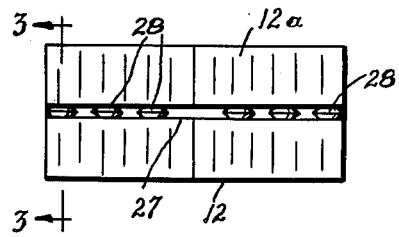
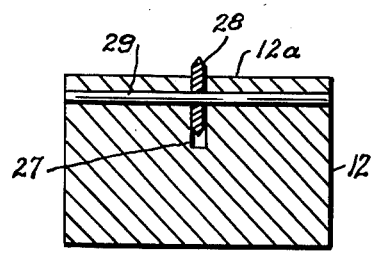
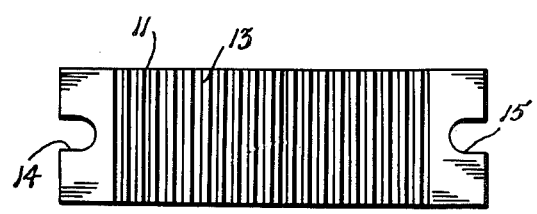
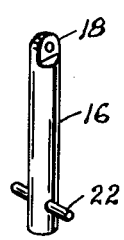
*Inventor:*
*Bernard A. Fightmaster*

United States Patent Office 3,027,638
Patented Apr. 3, 1962

3,027,638
PIPE CUTTERS
Bernard Arthur Fightmaster, 2 E. Franklin St.,
Liberty, Mo.
Filed Apr. 6, 1960, Ser. No. 20,413
1 Claim. (Cl. 30—100)

This invention relates to new and useful improvements in pipe cutters, and the principal object of the invention is to provide a device of the character herein disclosed which may be employed for quick, easy and efficient cutting of pipe.

As such, the invention is adapted either to be used in conjunction with the head of a conventional pipe vise stand, or by itself in a very easily portable form in which it is particularly well suited for use in poorly accessible quarters, such as for example, when cutting soil pipe in trenches or ditches formed in the ground.

Some of the advantages of the invention reside in its simplicity of construction, in its efficient operation, and in its adaptability to economical manufacture.

With the above more important objects and features in view and such other objects and features as may become apparent as this specification proceeds, the invention will be understood from the following description taken in conjunction with the accompanying drawing, wherein like characters of reference are used to designate like parts, and wherein:

FIGURE 1 is an elevational view of the invention;

FIGURE 2 is a top plan view of the saddle used in the invention;

FIGURE 3 is a sectional view, on an enlarged scale, taken substantially in the plane of the line 3—3 in FIGURE 2;

FIGURE 4 is a top plan view of the supporting base;

FIGURE 5 is a fragmentary elevational view of the chain used in the invention; and FIGURE 6 is a perspective view of the anchoring post used at one end of the chain.

Referring now to the accompanying drawing in detail, the pipe cutter in accordance with the invention is designated generally by the reference numeral 10 and embodies in its construction a supporting member 11 which may be in the form of an elongated block-shaped base, as shown.

A pipe receiving saddle 12 is removably positioned on the member 11, for which purpose the member 11 is formed with a substantially shallow V-shaped upper surface portion provided with transverse serrations 13 to accommodate corresponding serrations provided at the substantially shallow V-shaped underside of the saddle 12, as will be readily apparent.

The base member 11 may be especially constructed to receive the saddle 12, in which event the entire device will assume a readily portable nature and will be well suited for use in constricted or poorly accessible quarters, such as for example, when cutting soil pipe in ground trenches, or the like. Alternatively, the saddle 12 may be simply positioned on the head of a conventional pipe vise stand, which head is already provided with the serrated surface portion 13 and with recesses 14, 15 hereinafter described.

The open-sided recesses 14, 15 are formed in the end portions of the supporting member 11 as is best shown in FIGURE 4 and are adapted to receive therein, respectively, an anchoring post 16 and a screw-threaded stud 17. The post 16 and the stud 17 are provided at their upper end with an apertured ear 18 for pivotal connection by suitable pins 19 to the ends of a chain 20. The chain 20 is adapted to extend over the saddle 12 from one end of the member 11 to the other and to embrace a pipe 21 positioned in the saddle to be cut.

The anchoring post 16 is prevented from being withdrawn upwardly from the recess 14 by a keeper pin 22 which extends transversely of the lower end portion of the post and abuts the underside of the member 11, as shown. A nut 23, equipped with a suitable handle 24, is positioned on the lower end portion of the stud 17 and also abuts the underside of the member 11, whereby the chain 20 may be tightened as desired. By simply loosening the nut 23, the chain may be slackened sufficiently to permit withdrawal of the post 16 and stud 17 laterally from the recesses 14, 15, whereby to effect ready separation of the chain 20 from the member 11 and facilitate positioning or removal of the pipe 21 on and from the saddle 12.

The chain 20 includes pairs of overlapping links 20a, 20b which are pivoted together by transverse pins 25, and sharp-edged, disc-shaped cutting elements or rollers 26 are rotatably mounted on the pins 25 between the links 20a, as is clearly shown in FIGURE 5.

The saddle 12 is formed with a substantially shallow V-shaped upper surface 12a and with a groove 27 which extends longitudinally of the surface 12a to accommodate additional cutting elements 28, similar to the elements 26. The elements 28 are rotatably mounted on shafts or pins 29 extending transversely of the saddle 12, as shown in FIGURE 3.

The cutter elements 26, 28 are disposed in a common vertical plane when the chain 20 is applied to the member 11 and project outwardly from both the saddle and the chain to a sufficient extent to cut through the wall of the pipe 21 when the latter is positioned in the device.

In operation, the pipe 21 is placed in the device as shown in FIGURE 1 and the chain 20 is tightened by the nut 23 so that the cutting rollers 26, 28 engage the pipe and sever the same with a true circular cut as pressure is applied by tightening of the nut 23. The chain 20, of course, may be of any suitable length to accommodate pipes of various diameters and, if desired, the pins 25 of the chain may be made removable to facilitate taking out or insertion of links in the chain to vary the length thereof.

While in the foregoing there has been shown and described the preferred embodiment of the invention, various modifications may become apparent to those skilled in the art to which the invention relates. Accordingly, it is not desired to limit the invention to this disclosure and various modifications may be resorted to such as may lie within the spirit and scope of the appended claim.

What is claimed as new is:

A portable pipe cutter, comprising in combination an elongated block-shaped supporting member having upper and lower surfaces, the upper surface of said member being V-shaped with sloping surface portions converging longitudinally toward the center of the support member, said sloping surfaces being provided with transversely extending V-shaped grooves and with transversely extending V-shaped ribs between said grooves, an elongated pipe receiving saddle removably positioned on the upper surface of said support member and having V-shaped upper and lower surfaces with sloping surface portions converging longitudinally toward the center of the saddle, the sloping portions of the lower surface of said saddle being provided with transversely extending V-shaped grooves and with transversely extending V-shaped ribs between the grooves interfitting the respective ribs and grooves of said support member, an adjustable chain connected at its ends to end portions of the support member and adapted to embrace a pipe positioned in said saddle, and a plurality of co-planar cutter elements provided on said chain and on the upper surface of said saddle.

References Cited in the file of this patent
UNITED STATES PATENTS

| | | |
|---|---|---|
| 825,215 | Holland | July 3, 1906 |
| 1,020,580 | Smith | Mar. 19, 1912 |
| 1,173,041 | Saylor | Feb. 22, 1916 |
| 2,716,280 | Ruhe | Aug. 30, 1955 |